United States Patent Office 3,803,273
Patented Apr. 9, 1974

3,803,273
CERAMIC FUEL FABRICATION PROCESS PROVIDING CONTROLLED DENSITY AND GRAIN SIZE
Howard W. Hill, Fremont, Alexis I. Kaznoff, Castro Valley, and Mickey O. Marlowe, Livermore, Calif., assignors to General Electric Company
No Drawing. Filed Aug. 27, 1971, Ser. No. 175,746
Int. Cl. G21c 21/02
U.S. Cl. 264—.5
6 Claims

ABSTRACT OF THE DISCLOSURE

A method for fabricating ceramic fuel having controlled density and grain size is described. Ceramic powders of any given initial grain size are subjected to forming pressures to produce a structure of desired configuration followed by high temperature sintering to give controlled grain growth and to form a solid structure. The structure is then disintegrated by suitable means including a cyclic oxidation-reduction sequence to separate the grains along grain boundaries thus preserving the size and identity of the grains of the ceramic fuel. The grains are subjected to forming pressures to produce a structure of desired configuration and subjected to a high temperature sintering to achieve a solid body. The invention is applicable to ceramics such as uranium dioxide and other compounds of multivalent cations.

BACKGROUND OF THE INVENTION

This invention relates to a method of fabricating ceramic fuel to a solid structure of desired configuration to achieve desired and grain size in the resulting structure. Ceramic structures containing fissionable materials of uniform density and grain size are particularly useful in the generation of energy by neuclear fission including nuclear fission chain reactions. Such structures are commonly enclosed in a metal container or clad for use in a nuclear reactor. The grain size of ceramic structures is important because this property is related to the performance of the ceramic fuel especially when the ceramic is subjected to elevated temperatures. In particular the grain size of a ceramic is related to the creep resistance of the material under elevated temperatures. A coarse grained ceramic nuclear fuel material has been found to have a very low creep rate and at higher temperature this materials expands exerting pressure on the metal container or clad which holds the fuel in the nuclear reactor. A fine grained ceramic nuclear fuel material has been found to be more susceptible to creep than structures of coarse grained uranium dioxide, and this creep alleviates severe pressures on the metal container or clad at high operating temperatures.

Depending upon the particular end utilization of a ceramic material the susceptibility of the structure to creep may or may not be a desirable property. In one instance, when a ceramic is used as a nuclear fuel pellet in a fuel element for a nuclear reactor, a fine grained ceramic is desired because this material is particularly susceptible to creep and deformation. In this manner the ceramic fuel tends to be easily deformed at high temperatures under long periods of time so that the clad holding the nuclear fuel material is subjected to considerably lower stresses from the ceramic fuel. When a ceramic structure is used in other than nuclear applications, creep in some instances is not a desirable property because structural integrity is the desired property. For such applications a coarse grained ceramic structure would be utilized.

Currently in the production of ceramic structures, the general grain size of the structure is controlled by controlling the time at sintering temperature. Thus for coarser grain sizes of ceramic, a longer time at sintering temperature is necessary to achieve the grain growth required for such a ceramic structure. For a finer grain size of ceramic a shorter time at sintering temperature is necessary to achieve the grain growth required for such a ceramic structure. However this can interfere with the development of other properties in the ceramic structures such as the strength of the structure, especially if the normal sintering time is sharply reduced. Accordingly it is desirable to have a method of fabricating ceramic structures whereby the average grain size of the resulting ceramic structure can be within a controlled range varying from a generally finer grain structure to a generally coarser grain structure depending upon the average grain size desired.

SUMMARY OF THE INVENTION

A new method for fabricating a ceramic structure has been surprisingly discovered which enables control of the resulting density and grain size of the ceramic structure. The method is applicable to the fabrication of powders of any compound which is formed of multivalent cations or a mixture of multivalent cations. The present invention comprises the steps of (a) compacting a refractory powder made up of particles having a smaller size than desired in the resulting ceramic structure, (b) heating the first compact to effect a sintering and controlled grain growth, (c) converting the compact to uniform powder by separating the enlarged grains of the compact along their boundaries, (d) compacting the powder of step (c), and (e) heating the second compact of step (d) at a temperature for a sufficient time to effect sintering of the second compact. The average grain size of the second compact can vary widely with a representative range of the average grain size being from about 0.2 to about 40 microns.

DETAILED DESCRIPTION OF THE INVENTION

According to one process of this invention, ceramic powder compositions can be fabricated into solid structures having a predetermined, desired grain size and density. One step of the process includes increasing the grain size of the ceramic by sintering first compacts made from the ceramic powder having an initial grain size smaller than desired in the final structure or second compact. Very small size ceramic particles, usually about 0.1 micron up to 20 microns, are available as commercial powders. In any event, if the ceramic powder size is not sufficiently small, the powder can be crushed mechanically or treated by other suitable means known in the art to produce the smaller size particles for practice of the process of this invention.

It is preferred to initially start with ceramic powders having the smallest spread in the size of powder particles as can be commercially obtained. Ceramic compounds produced by standard chemical techniques are normally suitble starting materials for making fabricated ceramic structures having controlled grain size and density.

The selected ceramic powder is compressed into a first compact (e.g., a cylindrical pellet shape in one practice of the invention) having a generally low density (for example, for $UO_2$ a density of about 4 to about 7 grams per cubic centimeter). The compaction has application of pressures in the range of about 5,000 p.s.i. or higher (e.g., up to about 100,000 p.s.i.) and can be performed by uniaxial or isostatic pressing processes. Isostatic pressing is preferred because it gives uniformity of the microstructure in the first compact which results in more uniformity in the grain size in the final ceramic structures of this invention.

The first compacts are heated under a controlled atmosphere (e.g., dry $H_2$) to form a sintered compact at a sintering temperature (e.g., about 1000 to about 1900° C.) for an extended period of time (e.g., about 0.5 to about 100 hours) to increase the grain size of the first compact to correspond to the final grain size desired in the final ceramic structures of this invention. The sintering temperature and the time at sintering temperature will have to be established for each different starting material in the first compact according to the average particle size of the starting material and its grain growth kinetics. In practice it has been found that there is a decrease in the surface area (increase in diameter size) of the grains in the compact with increasing sintering temperature and/or time at sintering temperature. The grain growth of the sintered compact can be readily controlled since the increase in size of the grains is gradual over the sintering process. Other sintering atmospheres in addition to dry hydrogen include the inert gases, nitrogen and others.

The sintered compact is next subjected to disintegration along grain boundaries to achieve a powder of particle size equal to the grain size in the sintered compact. One preferred method is by subjecting the sintered compact to repeated oxidation-reduction cycles. In this method of forming a powder, the oxidation is carried out by heating the sintered compact in an atmosphere which causes the cation to attain a higher valence state, and reduction is accomplished by heating the oxidized compact in an atmosphere which causes the cation to return to the former valence state. The degree of disintegration can be inspected with a scanning electron microscope. In one preferred practice of this invention for uranium dioxide, a first uranium dioxide ($UO_2$) compact is oxidized by heating the compact in an oxidizing atmosphere to form $U_3O_8$ followed by heating in a reducing atmosphere to achieve uranium dioxide. An alternate method of converting the sintered compact to powder is to expose the compact to extremely sharp changes in conditions causing the compact to break up along the grain boundaries. One such method would be the use of thermal shocking techniques with wide changes in temperature.

By oxidizing and reducing the first compact, for example oxidizing a $UO_2$ pellet to $U_3O_8$ and reducing it to $UO_2$, disintegration of the pellet occurs because of the very large forces created by the volume change in going from $UO_2$ to $U_3O_8$ due to the changes in crystalline form (cubic to orthorhombic to cubic). It has been found that breakdown of the pellet occurs principally along the grain boundaries when the foregoing is practiced. A typical process for $UO_2$–$U_3O_8$ is heating to 600° C. in air for the oxidizing atmosphere and 600° C. in dry hydrogen for the reducing atmosphere, each being for a period of time up to about 6 hours. The powder produced in this way is then ground lightly to complete the separation of particles. The oxidation-reduction cycle can be repeated as many times as needed to obtain complete fracturing of the compact along the grain boundaries.

The ceramic powder with each powder particle substantially comprised of a single grain is next formed into a second compact similar to the practice of the first compaction step described above. Compaction can be performed using uniaxial or isostatic pressing at pressures in the range of about 5,000 to about 100,000 p.s.i. and generally higher densities are usually achieved in this step. Again isostatic pressing is preferred as it gives uniformity in the microstructure of the second compact which results in more uniform size grains in the final sintered ceramic structures.

The second compact is now subjected to a heating step at a sintering temperature sufficient to enable the green compact structure to be sintered to the desired density. The sintering step is done under a controlled atmosphere so the ceramic material does not undergo any change in composition such as a higher oxide produced by oxidation. An example of the controlled atmosphere when uranium dioxide is sintered is the use of dry hydrogen. Several other atmospheres, including the inert gases, nitrogen and others, could be utilized for this step. The temperature and time at sintering temperature can be varied to control the density and generally maintain the same grain size in the sintered product. Typical heat treatment for uranium dioxide consists of holding the second compact at temperatures in the range of about 1000 to about 1500° C. for times of from about one-half an hour up to about 4 hours, depending upon the density desired for the sintered product.

Variations of the same process may produce uniform powders of other ceramics, such as oxides, nitrides, sulfides, phosphides and other compounds of multivalent cations or mixtures of multivalent cations (e.g., plutonium oxide and uranium oxide). One crucial step to be identified for each potential compound used in the practice of this invention is the ability of a sintered structure of the compound to be disintegrated into individual grains without the loss of identity of the individual grain. Representative oxidation-reduction cycles for other compounds such as a nitride include starting with UN, nitriding the sintered UN body to $UN_2$ and then reducing it back to UN. Other examples will be apparent to a person having ordinary skill in the art. In the practice of this invention it has been found that variations in size between the individual particles of the disintegrated compart are of the order of about 0.2 micron or less.

The following illustrative, but not limiting, example of this invention as it has been carried out in practice is offered as further disclosure of the practice of this invention.

EXAMPLE

The following procedure is used to make a sintered uranium dioxide structure. The starting material is a commercial grade uranium dioxide powder having an average particle size of about .4 micron. The powder is formed into shaped pellets one inch long and one inch in diameter by two-directional pressing at about 12,500 p.s.i. Isostatic pressing of this pellet at about 50,000 p.s.i. produces a first compact with uniform density of about 50 percent of theoretical density throughout the pellet. The green compact structure is sintered at 1600° C. for four and one-half hours under dry hydrogen, and then is subjected to four oxidation-reduction cycles. Oxidation is carried out by heating the first compact in an oxygen atmosphere at 600° C. for six hours and reduction is accomplished by heating the oxidized compact in a dry hydrogen atmosphere at 600° C. for four hours. The powder obtained after the four cycles averaged 8 microns in diameter when inspected by scanning with an electron microscope and each particle of powder is comprised of a single grain. The standard deviation of particle size was shown by scanning with the electron microscope to be 0.21 micron. The powder obtained from the oxidation-reduction cycles is next compacted into shaped pellets one inch long and one inch in diameter by two-directional pressing at about 12,500 p.s.i. Isostatic pressing of the pellet at about 50,000 p.s.i. produces a second compact with uniform density of about 55 percent of theoretical density throughout the pellet. The second compact structure is sintered at 1200° C. for four hours under dry hydrogen. The resulting sintered uranium dioxide body had an average grain size of 10 microns and a density of 80 percent of theoretical density.

While an illustrative embodiment of the invention has been described herein, modifications and adaptations of the invention may be made by those skilled in the art without departure from the spirit and scope of the invention as defined by the following claims.

What is claimed is:

1. A process for controlling density and grain size during fabrication of a ceramic nuclear fuel comprising the steps of
    (a) forming into a first compact a ceramic powder of said nuclear fuel having an average particle size in the range of about 0.1 to about 20 microns by applying a pressure of at least 5000 p.s.i., (b) sintering the first compact under a controlled atmosphere at a temperature in the range of about 1000 to 1900° C. for a time in the range of about 0.5 to about 100 hours to form a final desired grain size in the compact whereby the average grain size is increased to the final desired grain size in the range of about 0.2 to about 40 microns, (c) disintgerating the sintered first compact to a powder by at least four repeated oxidation-reduction cycles being performed on said first compact so that each resulting powder particle is substantially comprised of a single grain, (d) forming a second compact of the powder resulting from step (c) by applying pressure in the range of about 5000 to about 100,000 p.s.i., (e) sintering the second compact to a desired in a controlled atmosphere at a sintering temperature in the range of about 1000 to 1500° C. for a time in the range of abuot 0.5 to about 4 hours so as to effect sintering of the compact substantially free of further grain growth above the final desired grain size.

2. A process according to claim 1 wherein the compact of step (a) is formed by applying isostatic pressure of at least about 5,000 p.s.i.

3. A process according to claim 1 in which the ceramic fuel is uranium dioxide.

4. A process according to claim 1 in which the ceramic fuel is a uranium nitride.

5. A process according to claim 1 in which the controlled atmosphere used in step (e) is dry hydrogen.

6. A process according to claim 1 in which the controlled atmosphere used in step (b) is dry hydrogen.

References Cited

UNITED STATES PATENTS

| 3,288,595 | 11/1966 | Reichard | 23—355 X |
| 3,140,151 | 7/1964 | Foltz et al. | 23—355 |
| 3,094,377 | 6/1963 | Langrod | 23—355 |
| 3,309,322 | 3/1967 | Anselin et al. | 264—0.5 |
| 3,417,167 | 12/1968 | Kizer et al. | 264—0.5 |
| 3,189,666 | 6/1965 | Levey, Jr. et al. | 23—355 X |
| 3,371,133 | 2/1968 | Nishijima et al. | 264—0.5 |

FOREIGN PATENTS

| 686,364 | 5/1964 | Canada | 264—0.5 |
| 246,320 | 1/1961 | Australia | 264—0.5 |

CARL D. QUARFORTH, Primary Examiner

R. S. GAITHER, Assistant Examiner

U.S. Cl. X.R.

423—253, 261

UNITED STATES PATENT OFFICE
CERTIFICATE OF CORRECTION

Patent No. 3,803,273    Dated   9 April 1974

Inventor(s)  H. W. Hill/A. I. Kaznoff/M. O. Marlowe

It is certified that error appears in the above-identified patent and that said Letters Patent are hereby corrected as shown below:

Column 1, line 32, after "desired" insert --density--; line 35, "neuclear" should be --nuclear--; and line 46, "materials" should be --material--. Column 2, line 56, "suitble" should be --suitable--. Column 4, line 23, "compart" should be --compact--. Column 5, line 16, after "desired" insert --density--; and line 19, "abuot" should be --about--.

Signed and sealed this 26th day of November 1974.

(SEAL)
Attest:

McCOY M. GIBSON JR.            C. MARSHALL DANN
Attesting Officer              Commissioner of Patents